United States Patent
Hu et al.

(10) Patent No.: US 10,974,730 B2
(45) Date of Patent: Apr. 13, 2021

(54) VEHICLE PERCEPTION SYSTEM ON-LINE DIANGOSTICS AND PROGNOSTICS

(71) Applicant: GM Global Technology Operations LLC, Detroit, MI (US)

(72) Inventors: Yao Hu, Sterling Heights, MI (US); Wen-Chiao Lin, Rochester Hills, MI (US); Wei Tong, Troy, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 16/139,782

(22) Filed: Sep. 24, 2018

(65) Prior Publication Data

US 2020/0094848 A1  Mar. 26, 2020

(51) Int. Cl.
| | |
|---|---|
| *B60W 50/02* | (2012.01) |
| *G07C 5/08* | (2006.01) |
| *G01C 21/30* | (2006.01) |
| *G07C 5/00* | (2006.01) |

(52) U.S. Cl.
CPC ......... *B60W 50/0205* (2013.01); *G01C 21/30* (2013.01); *G07C 5/008* (2013.01); *G07C 5/0808* (2013.01); *B60W 2050/0215* (2013.01)

(58) Field of Classification Search
CPC ..... B60W 50/0205; B60W 2050/0215; B60W 40/00; B60W 50/00; B60W 2050/0043; G07C 5/0808; G07C 5/008; G01C 21/30
USPC ....................................................... 701/30.5
See application file for complete search history.

(56) References Cited

U.S. PATENT DOCUMENTS

| | | | | |
|---|---|---|---|---|
| 2007/0282506 | A1* | 12/2007 | Breed ............... | G06K 9/00838 701/45 |
| 2008/0144944 | A1* | 6/2008 | Breed ............... | G06K 9/00832 382/224 |
| 2009/0092284 | A1* | 4/2009 | Breed ................... | B60N 2/002 382/103 |

(Continued)

OTHER PUBLICATIONS

Jiang et al., Utility U.S. Appl. No. 15/688,467, filed Aug. 28, 2017.

(Continued)

*Primary Examiner* — Muhammad Shafi
(74) *Attorney, Agent, or Firm* — Quinn IP Law (57) ABSTRACT

A method of on-line diagnostic and prognostic assessment of an autonomous vehicle perception system includes detecting, via a sensor, a physical parameter of an object external to the vehicle. The method also includes communicating data representing the physical parameter via the sensor to an electronic controller. The method additionally includes comparing the data from the sensor to data representing the physical parameter generated by a geo-source model. The method also includes comparing results generated by a perception software during analysis of the data from the sensor to labels representing the physical parameter from the geo-source model. Furthermore, the method includes generating a prognostic assessment of a ground truth for the physical parameter of the object using the comparisons of the sensor data to the geo-source model data and of the software results to the geo-source model labels. A system for on-line assessment of the vehicle perception system is also disclosed.

16 Claims, 5 Drawing Sheets

(56) References Cited

U.S. PATENT DOCUMENTS

2014/0071281 A1* 3/2014 Wu .......................... G08G 1/04
                                                            348/148
2018/0137386 A1* 5/2018 Cohen ................ G06K 9/00201
2018/0293466 A1* 10/2018 Viswanathan ....... G05D 1/0246
2019/0066396 A1* 2/2019 Jiang ........................ G01S 7/40

OTHER PUBLICATIONS

Jiang et al., Utility U.S. Appl. No. 15/688,429, filed Aug. 28, 2017.
Lin et al., Utility U.S. Appl. No. 15/725,947, filed Oct. 5, 2017.

\* cited by examiner

| Source | Data | Result | Last Update Time |
|---|---|---|---|
| 20 | Suspicious | Suspicious | 2018-04-23 10:51:00 |
| 20 | Reliable | Suspicious | 2018-04-23 10:51:00 |
| 20 | N.A. | Reliable | 2018-04-23 10:51:00 |
| 200 | Reliable | Reliable | 2018-04-23 10:51:00 |
| 200 | Suspicious | N.A. | 2018-04-23 10:51:00 |
| 28 | N.A. | Reliable | 2018-04-23 9:51:00 |

VEHICLE PERCEPTION SYSTEM ON-LINE DIANGOSTICS AND PROGNOSTICS

INTRODUCTION

The present disclosure relates to on-line diagnostics and prognostics for a perception system of an autonomous vehicle.

Vehicular automation involves the use of mechatronics, artificial intelligence, and multi-agent systems to assist a vehicle's operator. Such features and the vehicles employing them may be labeled as intelligent or smart. A vehicle using automation for complex tasks, especially navigation, may be referred to as semi-autonomous. A vehicle relying solely on automation is consequently referred to as robotic or autonomous. Manufacturers and researchers are presently adding a variety of automated functions to automobiles and other vehicles.

Autonomy in vehicles is often categorized in discrete levels, such as Level 1—Driver assistance—where the vehicle may control either steering or speed autonomously in specific circumstances to assist the driver; Level 2—Partial automation—where the vehicle may control both steering and speed autonomously in specific circumstances to assist the driver; Level 3—Conditional automation—where the vehicle may control both steering and speed autonomously under normal environmental conditions, but requires driver oversight; Level 4—High automation—where the vehicle may complete a prescribed trip autonomously under normal environmental conditions, not requiring driver oversight; and Level 5—Full autonomy—where the vehicle may complete a prescribed trip autonomously under any environmental conditions.

Vehicle autonomy requires increasingly sophisticated perception systems, including various optical equipment and multitude sensors to detect objects and other obstacles surrounding the host vehicle, as well as on-board software for interpretation of captured data. Real-time diagnostics and verification of such equipment and software output may be advantageous for establishing a ground truth—information provided by direct observation, i.e., empirical evidence—regarding vehicle surroundings, and reliable control of the autonomous vehicle.

SUMMARY

A method of on-line diagnostic and prognostic assessment of an autonomous vehicle perception system includes detecting, via a sensor, a physical parameter of an object positioned external to the vehicle. The method also includes communicating data representing the physical parameter via the sensor to an electronic controller including a perception software. The method additionally includes comparing the data from the sensor to data representing the physical parameter generated by a geo-source model. The method also includes comparing results generated by the perception software during analysis of the data from the sensor to labels representing the physical parameter from the geo-source model. Furthermore, the method includes generating a prognostic assessment of a ground truth for the physical parameter of the object using the comparison of the data from the sensor to the data from the geo-source model and the comparison of the results generated by the software and the labels from the geo-source model.

The method may additionally include grouping and weighing, via the controller, results generated by the perception software and labels from the geo-source model according to an agreement therebetween.

The operation of generating the prognostic assessment of the ground truth for the physical parameter of the object may additionally include identifying trustworthiness of the sensor and the geo-source model using the grouping and weighing.

The operation of generating the prognostic assessment of the ground truth for the physical parameter of the object may additionally include using the identified trustworthiness of the sensor and the geo-source model.

The method may additionally include assessing, via the controller, existence of a fault in the sensor using the generated prognostic assessment of the ground truth and determining an error between the data from the sensor and the data from the geo-source model.

The method may further include assessing, via the controller, existence of a fault in the software using the generated prognostic assessment of the ground truth and determining an error between the results generated by the software and the labels from the geo-source model.

The physical parameter of the object may be at least one of an object type, an object location, and an object dimension or size.

The sensor may include a vehicle sensor arranged on the autonomous vehicle and a non-vehicle sensor arranged external to the autonomous vehicle.

The autonomous vehicle may be a host vehicle to the controller and the vehicle sensor, and the non-vehicle sensor may be arranged on a guest vehicle.

The vehicle sensor may include at least one optical device, and the optical device may be either a collector of light, such as a camera or laser light sensor, or an emitter of light, such as a LIDAR.

Also disclosed is a system for on-line diagnostic and prognostic assessment of an autonomous vehicle on-line perception system employing the above method.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
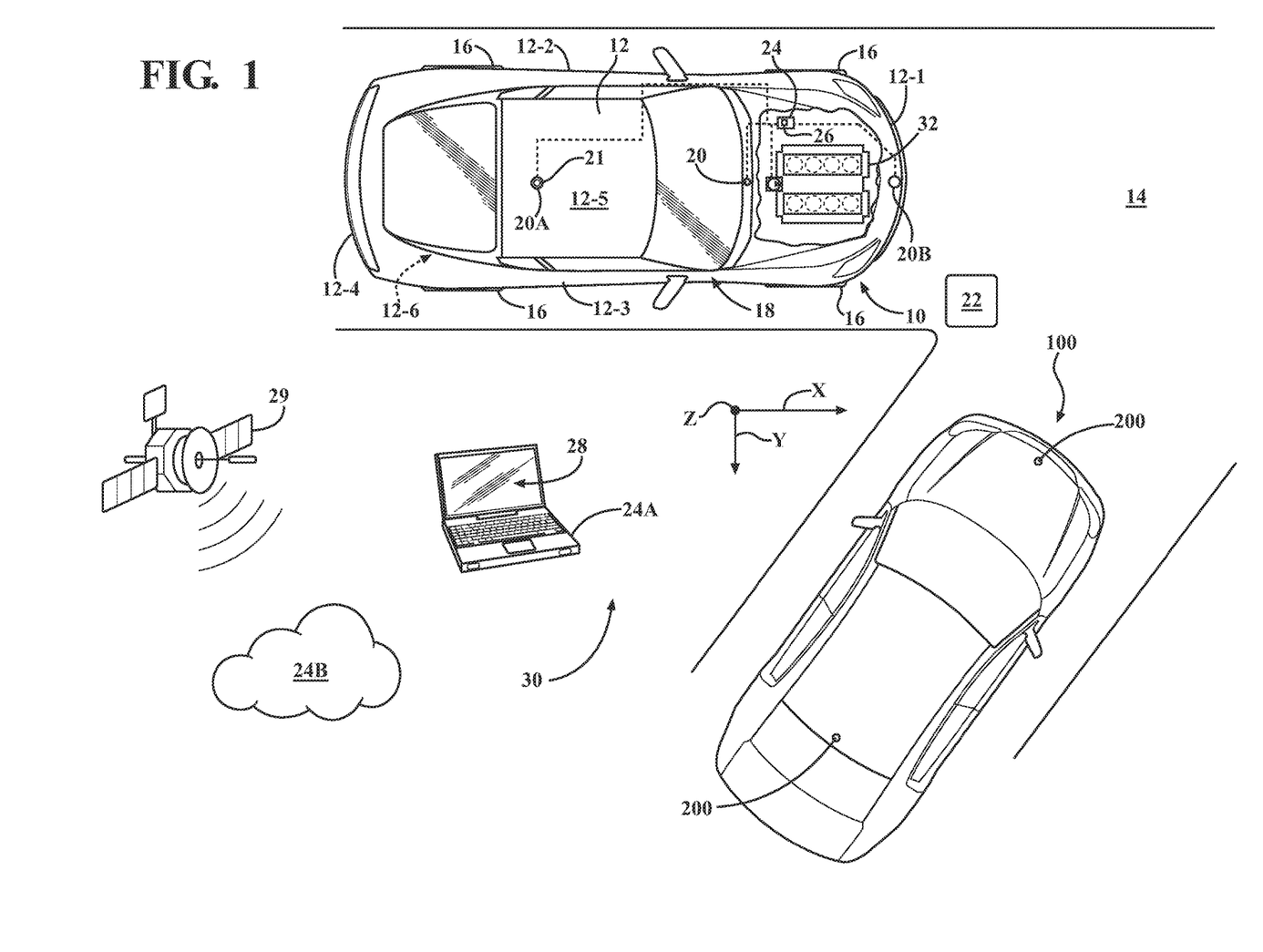
FIG. 1 is a plan view of an autonomous motor vehicle employing a perception system having an electronic controller and a system for on-line diagnostic and prognostic assessment of the perception system, wherein the diagnostic system uses a comparison of data from various sensors and a geo-source, according to the present disclosure.
Figure 2:
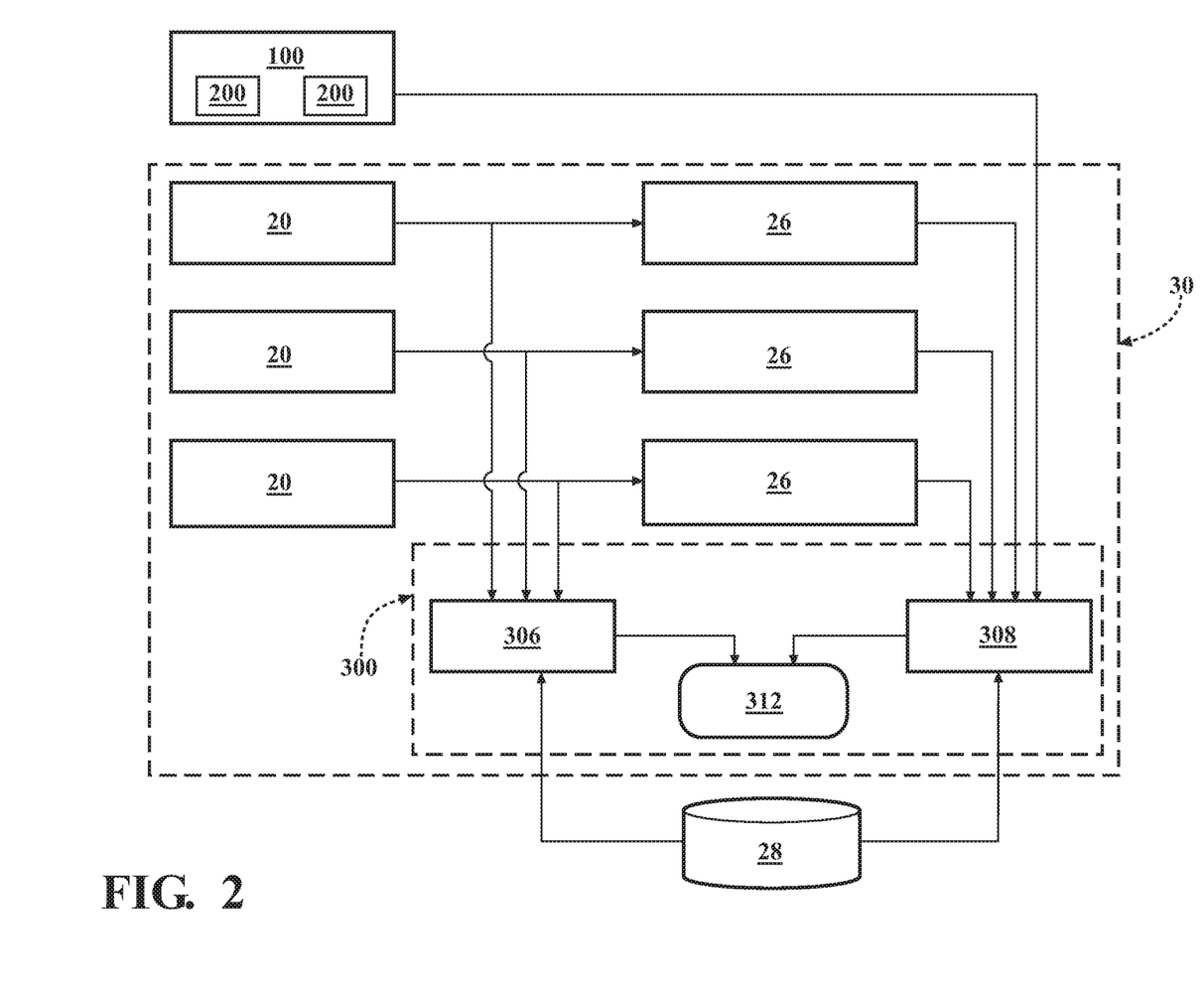
FIG. 2 is a schematic depiction of the system for on-line diagnostic and prognostic assessment of the autonomous motor vehicle perception system shown in FIG. 1, according to the present disclosure.

Referring to the drawings, wherein like reference numbers refer to like components, FIG. 1 shows a schematic view of an autonomous motor vehicle 10. The term "autonomous", as used herein, generally refers to the use of mechatronics, artificial intelligence, and multi-agent systems to provide varying levels of assistance to a vehicle's operator in controlling the subject vehicle. Such automation may include the entire range of assistance from the vehicle systems controlling either steering or speed autonomously in specific circumstances to assist the operator up to and including full automation which eschews operator involvement.

As shown, the autonomous motor vehicle 10 has a vehicle body 12. The vehicle body 12 may have a leading side or front end 12-1, a left body side 12-2, right body side 12-3, a trailing side or back end 12-4, a top side or section, such as a roof, 12-5, and a bottom side or undercarriage 12-6. The vehicle 10 may be used to traverse a road surface with respect to a general landscape or terrain 14. The vehicle 10 may include a plurality of road wheels 16. Although four wheels 16 are shown in FIG. 1, a vehicle with fewer or greater number of wheels, or having other means, such as tracks (not shown), of traversing the road surface or other portions of the terrain 14 is also envisioned.

The vehicle 10 uses a perception system 18 employing mechatronics, artificial intelligence, and a multi-agent system to assist the vehicle's operator. The perception system 18 may employ such features and various sources of data for complex tasks, especially navigation, to operate the vehicle 10 semi-autonomously, or rely solely on automation to operate the vehicle in a robotic or fully autonomous capacity. As shown in FIG. 1, as part of the perception system 18, multiple vehicle sensors 20 are arranged on the vehicle body 12 and used as sources of data to facilitate autonomous operation of the vehicle 10. Accordingly, the autonomous vehicle 10 may be identified as a host vehicle to the vehicle sensor(s) 20. Such vehicle sensors 20 may, for example, include an acoustic or optical device mounted to the vehicle body 12. Various embodiments of an optical device identified via respective numerals 20A and 20B are shown in FIG. 1. Specifically, such an optical device may be either an emitter 20A or a collector/receiver 20B of light. Either the emitter 20A or the receiver 20B embodiment of the optical device 20 may be mounted to one of the vehicle body sides 12-1, 12-2, 12-3, 12-4, 12-5, and 12-6.

Specifically, as shown in FIG. 1, the optical device 20 may be a laser beam source for a Light Detection and Ranging (LIDAR) system, and is specifically identified via numeral 20A. LIDAR is a surveying and remote sensing method that measures distance to a target by illuminating that target with a pulsed laser light, such as via the optical device described above, and measuring the reflected pulses with embedded sensor(s) 21. Differences in laser return times and wavelengths can then be used to make digital 3D-representations of the target. LIDAR is commonly used to make high-resolution maps, with applications in various scientific disciplines, such as geomatics, geography, atmospheric physics, and laser guidance. The LIDAR technology is frequently also used for control and navigation of autonomous vehicles, such as the vehicle 10. The LIDAR typically splits the laser beam into a plurality of beams for detection of objects at various distances from the source. Such a split beam configuration permits the LIDAR to obtain a spatial detection and description of the environment. Accordingly, in the case of LIDAR, the optical device is an emitter 20A of light.

Other examples of the subject optical device 20 may be a laser light sensor for an adaptive cruise control system or a camera (also shown in FIG. 1), which is specifically identified via numeral 20B. Adaptive cruise control is commonly used on motor vehicles, such as the vehicle 10, to automatically adjust the vehicle's speed to maintain a safe distance from other vehicles operating ahead. Such systems may use a radar or laser sensor and/or a stereo camera setup to detect when the vehicle 10 approaches another vehicle operating ahead. The subject system's detection and generated signals permit the vehicle 10 to timely brake and then accelerate when traffic clears up or again starts to flow, or identify an object emerging into the path or the vicinity of the vehicle 10. Accordingly, in the case of adaptive cruise control, the optical device is a collector or receiver 20B of light. In general, each of the vehicle sensors 20 is configured to detect at least one physical parameter of an object 22, which may be positioned external to the vehicle 10, for example, as part of the terrain 14. The object 22 may be inanimate, such as a tree, a building, a road or a traffic sign, an animal, or a person. An exemplary physical parameter of the representative object 22 may be object type, object location, object dimensions defining the object's size and shape, and the object's distance from the vehicle 10. Terrain 14 in the vicinity of the vehicle 10 may include multiple objects (shown in FIG. 3), such as the object 22, information regarding which may be used to assist with identification of trustworthiness or reliability of sensor(s) 20. The term "trustworthiness", as used herein, generally refers to the reliability of the hardware, e.g., sensors, and associated software in establishing a ground truth, i.e., information that may be obtained by direct observation or empirical evidence, regarding vehicle surroundings.

Each sensor 20 is also configured to capture data representing the physical parameter(s) of the object 22, and communicate the data to a data processor, which may be part of an electronic controller that will be described in detail below. Another sensor or set of sensors 200 may be located external to the autonomous vehicle 10. Specifically, as shown in FIG. 1, the sensor(s) 200 may be arranged on one or more vehicles 100, which are distinct from and therefore located external to the autonomous vehicle 10. The vehicle(s) 100 may thus be identified as guest vehicles when the vehicle 100 enters the vicinity of the vehicle 10, for example, a specific or predetermined area of terrain 14 surrounding the vehicle 10. As such, the sensor(s) 200 may be identified as non-vehicle sensor(s) with respect to the vehicle 10, while the autonomous vehicle 10 may be identified as a host vehicle to the vehicle sensor(s) 20. Similar to sensor(s) 20, each sensor 200 is configured to capture data representing the physical parameter(s) of the object 22, and transmit the data such that the data is available to the same data processor receiving the data from the sensor(s) 20.

As shown in FIG. 1, the perception system 18 also includes a programmable electronic controller 24. Although the controller 24 is depicted as being arranged on the autonomous vehicle 10, such that the vehicle 10 is a host to the controller 24, the subject controller may be alternatively arranged remotely with respect to the vehicle. The controller 24 includes a memory that is tangible and non-transitory. The memory may be a recordable medium that participates in providing computer-readable data or process instructions. Such a medium may take many forms, including but not limited to non-volatile media and volatile media. Non-volatile media used by the controller 24 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 24 may also include a flexible disk, hard disk, magnetic tape, other magnetic medium, a CD-ROM, DVD, other optical medium, etc. The controller 24 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 24 or accessible thereby may be stored in the memory and automatically executed to provide the required functionality.

The controller 24 may be configured, i.e., structured and programmed, to receive and process data signals indicative of the physical parameter(s) of the object 22 from any of the sensors 20 and 200. The controller 24 is specifically programmed with perception software 26 that may include an artificial intelligence (AI) algorithm configured to assess incoming data from the sensors 20 and 200. The perception software 26 would be generally configured to analyze and interpret the physical parameter data from the sensors 20. For example, the perception software 26 may be configured to define a positioning of the object 22 in the X-Y-Z coordinate system (shown in FIG. 1) and identify the object 22 using a pre-trained AI algorithm. The controller 24 is also in communication with a geo-source 28, such as the Google-Earth computer program that renders a simulated 3D representation of Earth based on imagery generated by an earth-orbiting satellite 29 (shown in FIG. 1), having a data model representative of terrain 14, including data representative of physical parameters of the object 22. The controller 24 is configured to use the geo-source 28, and is an additional source of data to augment and cross-check the data collected from any of the sensors 20 and 200.

Additionally, an external controller 24A and/or an information technology (IT) cloud platform 24B, as shown in FIG. 1, may be employed in communication with the controller 24 for coordinating and managing operation of a fleet of vehicles including vehicle 10 and 100. Generally, an IT cloud platform is a provider-managed suite of hardware and software. An IT paradigm enables universal access to shared pools of configurable system resources and higher-level services that may be rapidly provisioned with minimal management effort, often over the Internet. Furthermore, cloud computing relies on sharing of resources to achieve coherence and economies of scale, similar to a public utility.

As shown in FIG. 1, the vehicle 10 also includes a system 30 for on-line diagnostic and prognostic assessment of the autonomous vehicle 10 perception system 18. Within the context of the present disclosure, the term "on-line" signifies that the diagnostics and prognostics functions during regular operation of the perception system 18, i.e., the autonomous vehicle 10 is on the road, performing regular tasks. Furthermore, "on-line" is herein contrasted with "off-line" solution for diagnostics and prognostics, which would be performed separately from, i.e., temporally outside of, regular operation of a target vehicle. Each of the controller 24, the external controller 24A, and the IT cloud platform 24B may be part of the system 30. In such an embodiment, the external controller 24A and IT cloud platform 24B may be specifically configured to receive the generated sensory signals representative of the data from sensors 20 and 200.

Appropriate communication between the controller 24, the external controller 24A, and/or the IT cloud platform 24B may be accomplished via the earth-orbiting satellite 29. The system 30 employs an algorithm programmed into the controller 24 to compare the data representing the physical parameter(s) of the object 22 from at least the vehicle sensor 20, and optionally the sensor(s) 200, to the data representing the same physical parameter of the object 22 generated, i.e., simulated, by the geo-source 28 model. The data representing the physical parameter(s) of the object 22 from the sensor(s) 20 and 200 may be compared to the data generated by the geo-source 28 model point by point for stationary objects.

Figure 3:
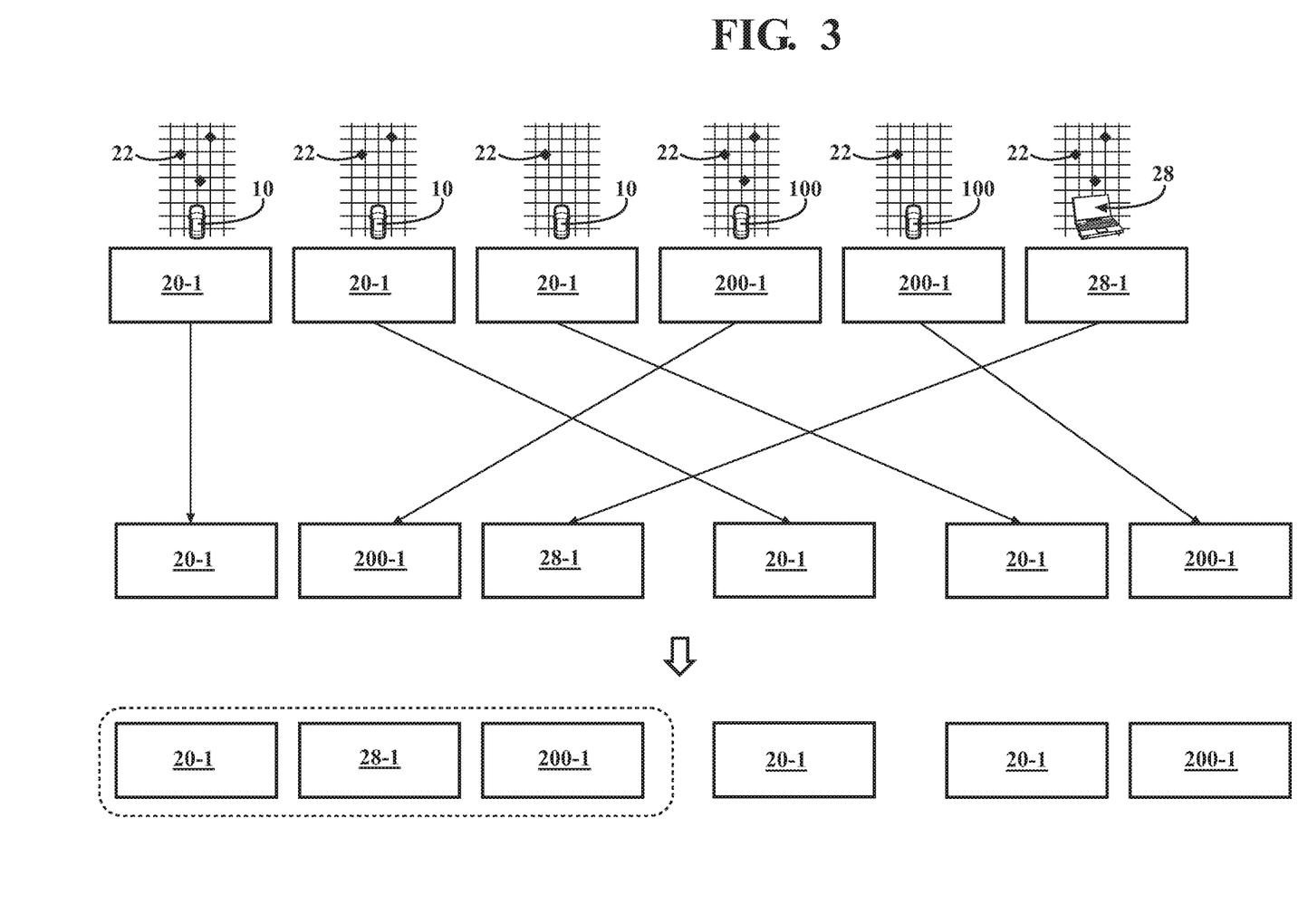
FIG. 3 is a flowchart showing an exemplary comparison and analysis of the results generated by perception system software and labels from a model generated by the geo-source, according to the present disclosure.

With reference to FIG. 3, the controller 24 is also configured or programmed to compare results 20-1 generated by the perception software 26 during analysis and interpretation of the data from at least the vehicle sensor 20 and optionally results 200-1 from the sensor(s) 200 to labels 28-1 from the geo-source 28 model representing the subject physical parameter. In general, images from two distinct sensors may not be compared directly due to different sensor positioning and naturally resultant image discrepancies. The results 20-1, 200-1 generated by the software 26 may be compared directly, while the geo-source 28 model is capable of simulating either an image or a dot position of the object 22. Accordingly, the comparison performed by the controller 24 uses the results 20-1, 200-1 of the sensors 20, 200 and the labels 28-1 of the geo-source 28 model. The controller 24 is furthermore programmed to generate a prognostic assessment of a ground truth for the physical parameter of the object 22.

Such assessment of the ground truth is accomplished using the comparison of the data from at least the vehicle sensor(s) 20, or from the vehicle sensor(s) 20 and the non-vehicle sensor(s) 200, to the data from the geo-source 28 model and the comparison of the results 20-1, 200-1 generated by the perception software 26 and the labels 28-1 from the geo-source model. Furthermore, such an assessment is tied to an identification of which sensor(s) 20, 200, the perception software 26, and the geo-source 28 model may be relied on for a trusted assessment of the ground truth for the object 22 physical parameter. In addition to data for the object 22, data for other objects (shown in FIG. 3) in the vicinity of the vehicle 10, e.g., relative to the terrain 14, may be used by the system 30 to assist with identification of reliability of sensor(s) 20, 200, the perception software 26, and the geo-source 28 model.

To such an end, the controller 24 may be further programmed to group and weigh results 20-1, 200-1 generated by the perception software 26 for the respective sensor(s) 20, 200 and labels 28-1 from the geo-source 28 model according to an agreement therebetween. Specifically, the controller 24 may select and group the sources from the array of sensor(s) 20, 200, the software 26, and the geo-source 28 model whose results 20-1, 200-1 and labels 28-1 are in agreement, such as within a predetermined numerical range. Additionally, the controller 24 may apply a predetermined weight to each of the results 20-1, 200-1 and labels 28-1 based on the trustworthiness and reliability of its respective source, i.e., the sensor(s) 20, 200 and the geo-source 28 model. For example, generally, camera 20B has a higher resolution than LIDAR 20A, and, therefore, the camera would be considered more accurate than the LIDAR. Consequently, the results 20-1 from the camera 20B would be assigned a higher predetermined weight than the results 20-1 from the LIDAR 20A. Following such a weight assignment, the total weight of each group of sources with results that are in agreement with each other would be determined and evaluated. Higher total weight of a group of sources having respective results in agreement signifies that it has more trustworthy and reliable results 20-1, 200-1, and labels 28-1. Thus, the results 20-1, 200-1, and labels 28-1 from the group with the highest total weight would be considered most trustworthy, and determined as providing the prognostic assessment of the ground truth for physical parameters of the object 22.

Specifically, the controller 24 may apply a comparatively higher weight to the group in which the above grouped results agree with majority of the other results, i.e., with each other, and thus being considered trustworthy or reliable. Similarly, the controller 24 may apply a comparatively lower weight to the group in which results 20-1, 200-1, and labels 28-1 appear to be outliers, i.e., disagree with majority of the others, and thus being considered suspect. In general, the results 20-1, 200-1 and labels 28-1 that don't agree with the prognostic assessment of the ground truth are considered suspect. On the basis of the above grouping and weighing of the results 20-1, 200-1 and labels 28-1, the controller 24 may further perform assessment of trustworthiness of the employed sensor(s) 20, 200 and the geo-source 28 model with respect to the identified object 22. An example of such an analysis is depicted in FIG. 3. By grouping and weighing the results 20-1, 200-1 and labels 28-1 to identify and select the most trustworthy or reliable data sources, the controller 24 may perform prognostic assessment of the ground truth for physical parameters of respective objects 22.

The generated prognostic assessment of the ground truth for the physical parameter of the object 22 may be used for subsequent assessment of an existence of a fault in the vehicle sensor 20 or the non-vehicle sensor 200. Such a fault assessment may include a comparison of the data from such a sensor 20, 200 and the data from the geo-source 28 model and determination of an error or discrepancy between the data from the subject sensor and the data from the geo-source model. In the event the determined error between the data from the subject sensor 20 or 200 and the data from the geo-source 28 model is outside a predetermined range of permissible error, and the labels 28-1 agree with the prognostic assessment of the ground truth based on grouping and weighing described above, the particular sensor may be identified as suspect. For example, if a result 20-1 or 200-1 of the respective sensor 20 or 200 is different from the label 28-1 of the geo-source 28 model, either the sensor 20, 200 or the geo-source 28 model may be suspect. Accordingly, if the label 28-1 is in the group identified with the prognostic assessment of ground truth, the label 28-1 is trustworthy, and, consequently, so is the sensor 20. Furthermore, a sensor 20, 200 providing a result 20-1, 200-1 that is different from that of the label 28-1 will be deemed suspect. If a sensor 20, 200 has been identified as suspect, data from the subject sensor may be disqualified, irrespective of the results generated for that sensor by the perception software 26. In such case, the comparison and further analysis may be performed using the remaining, identified as reliable, sensor(s) 20, 200 and/or the geo-source 28 model.

The generated prognostic assessment of the ground truth for the physical parameter of the object 22 may also be used for subsequent assessment of an existence of a fault in the perception software 26. Such a fault assessment may include a comparison of the results 20-1, 200-1 generated by the software 26 to the labels 28-1 from the geo-source 28 model and determination of a discrepancy between the results generated by the software and the labels from the geo-source model. Such a fault assessment may also include grouping and weighing of the results 20-1, 200-1, and labels 28-1 for determining the prognostic assessment of the ground truth, as described above. In the event the determined discrepancy between the results 20-1, 200-1 generated by the software 26 for the respective sensor(s) 20, 200 and the prognostic assessment of the ground truth is outside a predetermined range of permissible error, there may be a fault in the perception software 26 or in the particular sensor. Either way, the software 26 results 20-1, 200-1 for the subject sensor(s) 20, 200 may be identified as suspect.

In the case of suspect generated results 20-1, 200-1, if the data attributable to a specific sensor 20, 200 has been identified as not suspect, i.e., trustworthy, the software 26 associated with the specific sensor 20, 200 which generated the suspect results 20-1, 200-1 may then be identified as suspect. If both the data and the software results attributable to a specific sensor 20, 200 have been identified as suspect, the subject sensor may be disqualified for further analysis. Accordingly, the system 30 is capable of identifying whether the determined inaccuracy stems from a sensor 20, 200, i.e., the hardware, or from the perception software 26.

Figure 4:
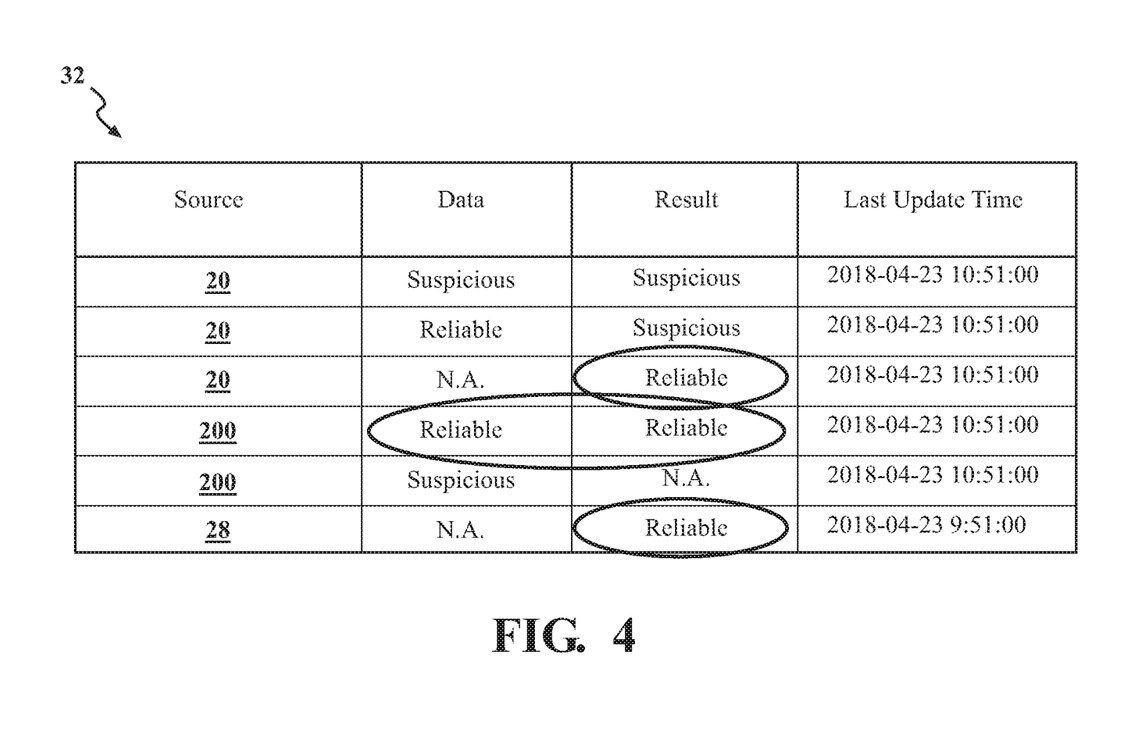
FIG. 4 is an exemplary table of graded perception system software results and the geo-source model labels based on prognostic assessment of the ground truth for an object's physical parameter, according to the present disclosure.

In the event results 20-1, 200-1 identified as the ground truth via the grouping and weighing agree, while disagreeing with the labels 28-1 from the geo-source 28 model, the geo-source model may be labeled suspect, and be disqualified for further analysis. The results of the above assessments may be organized in a table 32 of thus graded perception system software 26 results 20-1, 200-1 and labels 28-1 for the respective sensors 20, 200 and the geo-source 28 model, for example as shown in FIG. 4. The table 32 may be stored in the controller 24, the controller 24A, or the IT cloud platform 24B. The subject table 32 may then be accessed by the controller 24 to select reliable data sources from among the sensor(s) 20, 200 and the geo-source 28, and thereby generate the prognostic assessment of the ground truth for the physical parameter of a particular object 22.

Figure 5:
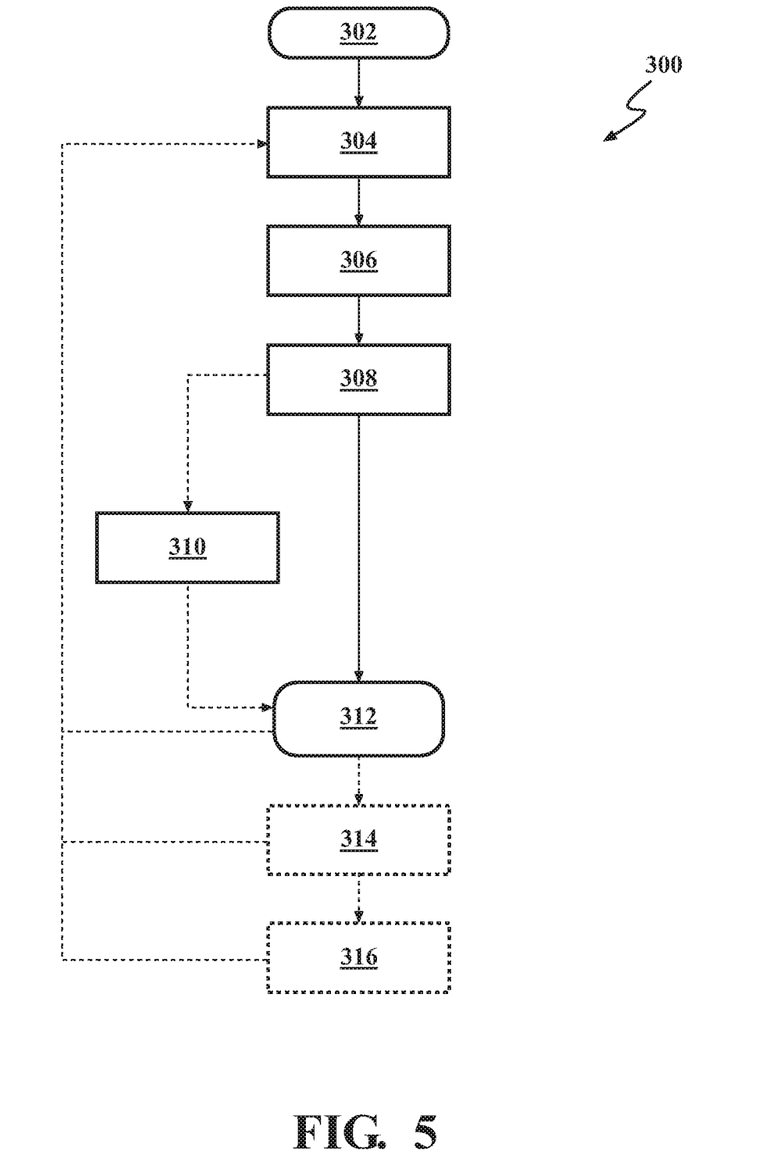
FIG. 5 is a flow diagram of a method of on-line diagnostic and prognostic assessment of an autonomous vehicle perception system shown in FIGS. 1-4, according to the present disclosure.

FIG. 5 depicts a method 300 of on-line diagnostic and prognostic assessment of an autonomous vehicle 10 perception system 18, as described above with respect to FIGS. 1-4. The method 300 may be performed via the electronic controller 24 including the perception software 26 and programmed with appropriate algorithms. The method 300 initiates in frame 302 with the vehicle 10 situated relative to or physically traversing the terrain 14 that includes the object 22. Following frame 302, the method proceeds to frame 304, where the method includes detecting, via the sensor(s) 20, 200, a physical parameter of the object 22 positioned external to the vehicle 10. In frame 304, the method also includes communicating data representing the subject physical parameter, via the sensor(s) 20, 200, to the electronic controller 24.

After frame 304, the method advances to frame 306. In frame 306, the method includes comparing, via the controller 24, the data representing the physical parameter from the sensor(s) 20, 200 to the data representing the same physical parameter generated by the geo-source 28 model. Following frame 306 the method proceeds to frame 308. In frame 308 the method includes comparing, via the controller 24, results 20-1, 200-1 generated by the perception software 26 during analysis and interpretation of the data from the vehicle sensor(s) 20, 200 to the labels 28-1 representing the physical parameter from the geo-source 28 model. Following frame 308, the method may access frame 310. In frame 310 the method includes grouping and weighing, via the controller 24, results 20-1, 200-1 generated by the perception software 26 and labels 28-1 from the geo-source 28 model according to an agreement therebetween, as described with respect to FIGS. 1-4.

After frame 308 or frame 310, the method advances to frame 312. In frame 312 the method includes generating, via the controller 24, prognostic assessment of the ground truth for the physical parameter of the object 22 using the comparison of the data from the sensor(s) 20, 200 to the data from the geo-source 28 model. In frame 312, the prognostic assessment of the ground truth for the physical parameter of the object 22 also uses the comparison of the results 20-1, 200-1 generated by the perception software 26 and the labels 28-1 from the geo-source 28 model. In frame 312, as described with respect to FIGS. 1-2, generating the prognostic assessment of the ground truth for the physical parameter of the object 22 may include identifying trustworthiness of the sensor(s) 20, 200 and the geo-source 28 model using the grouping and weighing.

In frame 312 generating the prognostic assessment of the ground truth for the physical parameter of the object 22 may additionally include using the identified trustworthiness of the sensor(s) 20, 200 and the geo-source 28 model. As described above with respect to FIGS. 1-4, in addition to data for the object 22, the method may use data for other objects (shown in FIG. 3) in the vicinity of the vehicle 10, i.e., situated in the terrain 14, to assist with identification of trustworthiness or reliability of sensor(s) 20, 200, the perception software 26, and the geo-source 28 model.

Following frame 312 the method may advance to frame 314 or to frame 316. In frame 314 the generated prognostic assessment of the ground truth for the object 22 physical parameter may be used for assessing existence of a fault in the sensor(s) 20, 200 and determining an error or discrepancy between the data from the sensor and the data from the geo-source 28 model. Additionally, in frame 316 the generated prognostic assessment of the ground truth for the object 20 physical parameter may be used for assessing existence of a fault in the software 26 and determining an error between the results generated by the software and the labels from the geo-source model. Following one of the frames 312, 314, or 316, the method may return to frame 304.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of on-line diagnostic and prognostic assessment of an autonomous vehicle perception system having a sensor, the method comprising:
   detecting, via the sensor, a physical parameter of an object positioned external to the vehicle;
   communicating data representing the physical parameter, via the sensor, to an electronic controller including a perception software;
   comparing, via the controller, the data from the sensor to data representing the physical parameter generated by a geo-source model;
   comparing, via the controller, results generated by the perception software during analysis of the data from the sensor to labels representing the physical parameter from the geo-source model;
   grouping and weighing, via the controller, results generated by the perception software and labels from the geo-source model according to an agreement therebetween; and
   generating, via the controller, a prognostic assessment of a ground truth for the physical parameter of the object using the comparison of the data from the sensor to the data from the geo-source model and the comparison of the results generated by the software and the labels from the geo-source model, wherein generating the prognostic assessment of the ground truth for the physical parameter of the object additionally includes identifying trustworthiness of the sensor and the geo-source model using the grouping and weighing.

2. The method according to claim 1, wherein the generating the prognostic assessment of the ground truth for the physical parameter of the object includes using the identified trustworthiness of the vehicle sensor and the geo-source model.

3. The method according to claim 1, further comprising assessing, via the controller, existence of a fault in the sensor using the generated prognostic assessment of the ground truth and determining an error between the data from the sensor and the data from the geo-source model.

4. The method according to claim 1, further comprising assessing, via the controller, existence of a fault in the software using the generated prognostic assessment of the ground truth and determining an error between the results generated by the software and the labels from the geo-source model.

5. The method according to claim 1, wherein the physical parameter of the object is at least one of an object type, an object location, and an object dimension.

6. The method according to claim 1, wherein the sensor includes a vehicle sensor arranged on the autonomous vehicle and a non-vehicle sensor arranged external to the autonomous vehicle.

7. The method according to claim 6, wherein the autonomous vehicle is a host vehicle to the controller and the vehicle sensor, and the non-vehicle sensor is arranged on a guest vehicle.

8. The method according to claim 1, wherein the sensor includes at least one optical device, and wherein the optical device is one of a collector and an emitter of light.

9. A system for on-line diagnostic and prognostic assessment of an autonomous vehicle perception system, the system comprising:
   a sensor configured to detect a physical parameter of an object positioned external to the autonomous vehicle;
   a geo-source arranged external to the autonomous vehicle; and
   an electronic controller including a perception software, in operative communication with the sensor and with the geo-source, and programmed to:
   receive data representing the physical parameter detected via the sensor;

compare the data from the sensor to data representing the physical parameter generated by a geo-source model;

compare results generated by the perception software during analysis of the data from the sensor to labels representing the physical parameter from the geo-source model;

group and weigh results generated by the perception software and labels from the geo-source model according to an agreement therebetween; and generate a prognostic assessment of a ground truth for the physical parameter of the object using the comparison of the data from the sensor to the data from the geo-source model, wherein generation of the prognostic assessment of the ground truth for the physical parameter of the object additionally includes identification of trustworthiness of the sensor and the geo-source model via use of the grouping and weighing.

10. The system according to claim 9, wherein the generation of the prognostic assessment of the ground truth for the physical parameter of the object includes use of the identified trustworthiness of the at least the vehicle sensor and the geo-source model.

11. The system according to claim 9, wherein the controller is further configured to assess existence of a fault in the sensor using the generated prognostic assessment of the ground truth and determining an error between the data from the sensor and the data from the geo-source model.

12. The system according to claim 9, wherein the controller is further configured to assess existence of a fault in the software using the generated prognostic assessment of the ground truth and determining an error between the results generated by the software and the labels from the geo-source model.

13. The system according to claim 9, wherein the physical parameter of the object is at least one of an object type, an object location, and an object dimension.

14. The system according to claim 9, wherein the sensor includes a vehicle sensor arranged on the autonomous vehicle and a non-vehicle sensor arranged external to the autonomous vehicle.

15. The system according to claim 14, wherein the autonomous vehicle is a host vehicle to the controller and the vehicle sensor, and the non-vehicle sensor is arranged on a guest vehicle.

16. The system according to claim 9, wherein the sensor includes at least one optical device, and wherein the optical device is one of a collector and an emitter of light.

* * * * *